(12) United States Patent
Renosky

(10) Patent No.: US 7,104,004 B1
(45) Date of Patent: Sep. 12, 2006

(54) BENDABLE FISHERS LURE WITH METHOD OF MANUFACTURE AND ASSEMBLY

(75) Inventor: Joseph Francis Renosky, P.O. Box 1198, Indiana, PA (US) 15701

(73) Assignee: Joseph Francis Renosky, Homer City, PA (US)

( * ) Notice: Subject to any disclaimer, the term of this patent is extended or adjusted under 35 U.S.C. 154(b) by 46 days.

(21) Appl. No.: 10/945,499

(22) Filed: Sep. 20, 2004

Related U.S. Application Data

(60) Provisional application No. 60/526,475, filed on Dec. 3, 2003, provisional application No. 60/511,617, filed on Oct. 15, 2003.

(51) Int. Cl.
*A01K 85/01* (2006.01)

(52) U.S. Cl. .................. 43/42.53; 43/42.24; 43/42.33; 425/588

(58) Field of Classification Search ............... 43/42.53, 43/42.32, 42.33, 42.24, 42.15; 264/1.31, 264/1.7, 157, 247, 297.8, 259, 263, 271.1, 264/279.1; 425/588
See application file for complete search history.

(56) References Cited

U.S. PATENT DOCUMENTS

| | | | | | |
|---|---|---|---|---|---|
| 2,596,883 | A | * | 5/1952 | Wise | 43/42.33 |
| 3,413,750 | A | * | 12/1968 | Henry | 43/42.33 |
| 3,528,189 | A | * | 9/1970 | Lilley, Jr. | 43/42.33 |
| 4,307,531 | A | * | 12/1981 | Honse | 43/42.32 |
| 5,494,432 | A | * | 2/1996 | Coggins et al. | 425/546 |
| 6,024,559 | A | * | 2/2000 | Coleman | 425/572 |
| 6,182,391 | B1 | * | 2/2001 | Hubbard | 43/42.33 |

* cited by examiner

*Primary Examiner*—Teri Pham Luu
*Assistant Examiner*—Kimberly S. Smith

(57) ABSTRACT

A fishers lure including a spine having a first eye on a first end of the spine adapted to attach a fishing line and a second end on spine adapted to receive a hook. A flexible body surrounding the spine such that the first eye protrudes from the front of the flexible body. A fisher can bend the spine and flexible body into a bent shape and the spine will retain the shape and hold the body in the bent shape. The bent shape will give the lure unique movement in the water that can be adjusted by the fisher re-bending the spine. The flexible body further includes a holographic film that can be molded into the body. A method of forming a plurality of lures from a single mold operation is also disclosed.

8 Claims, 6 Drawing Sheets

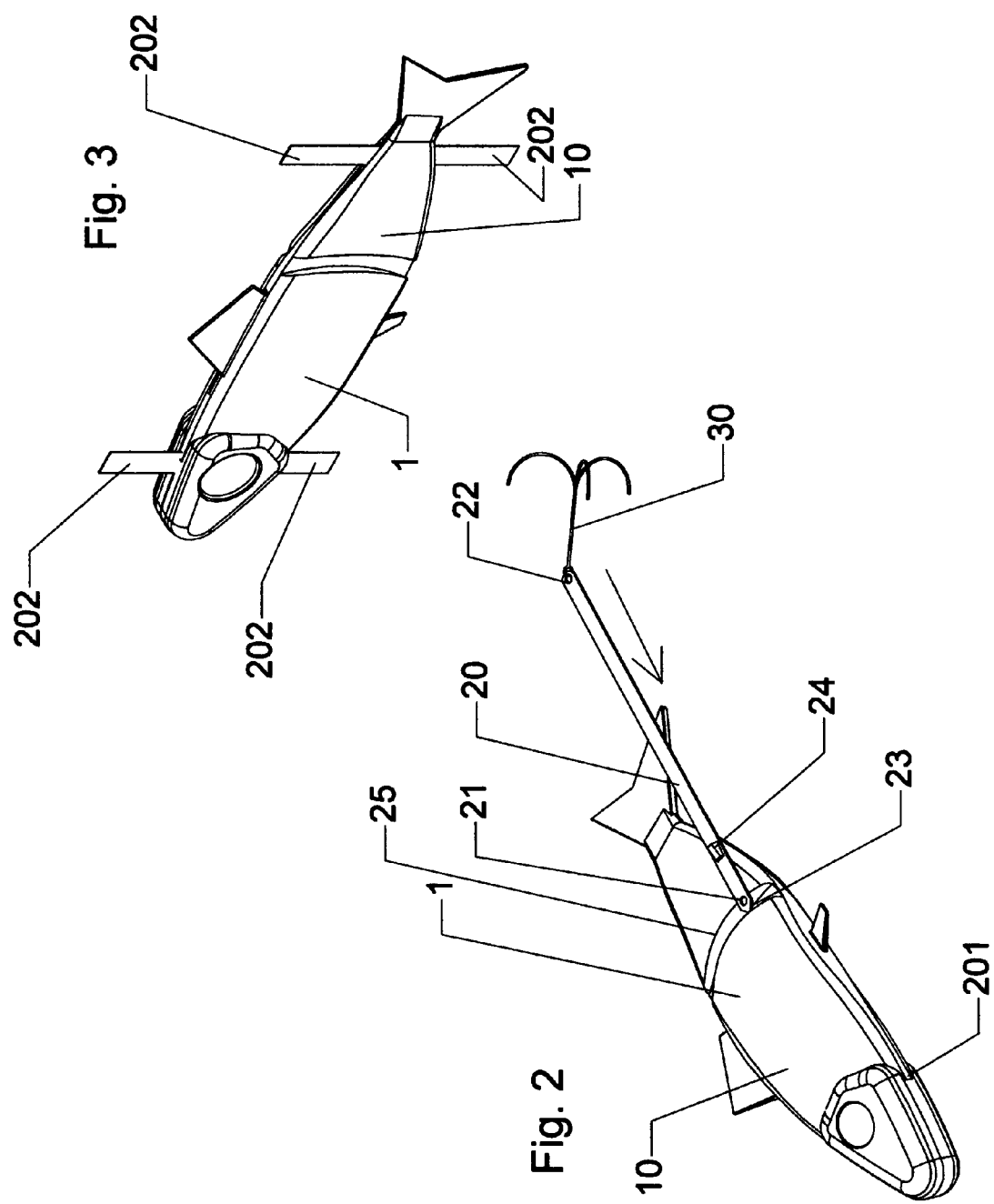

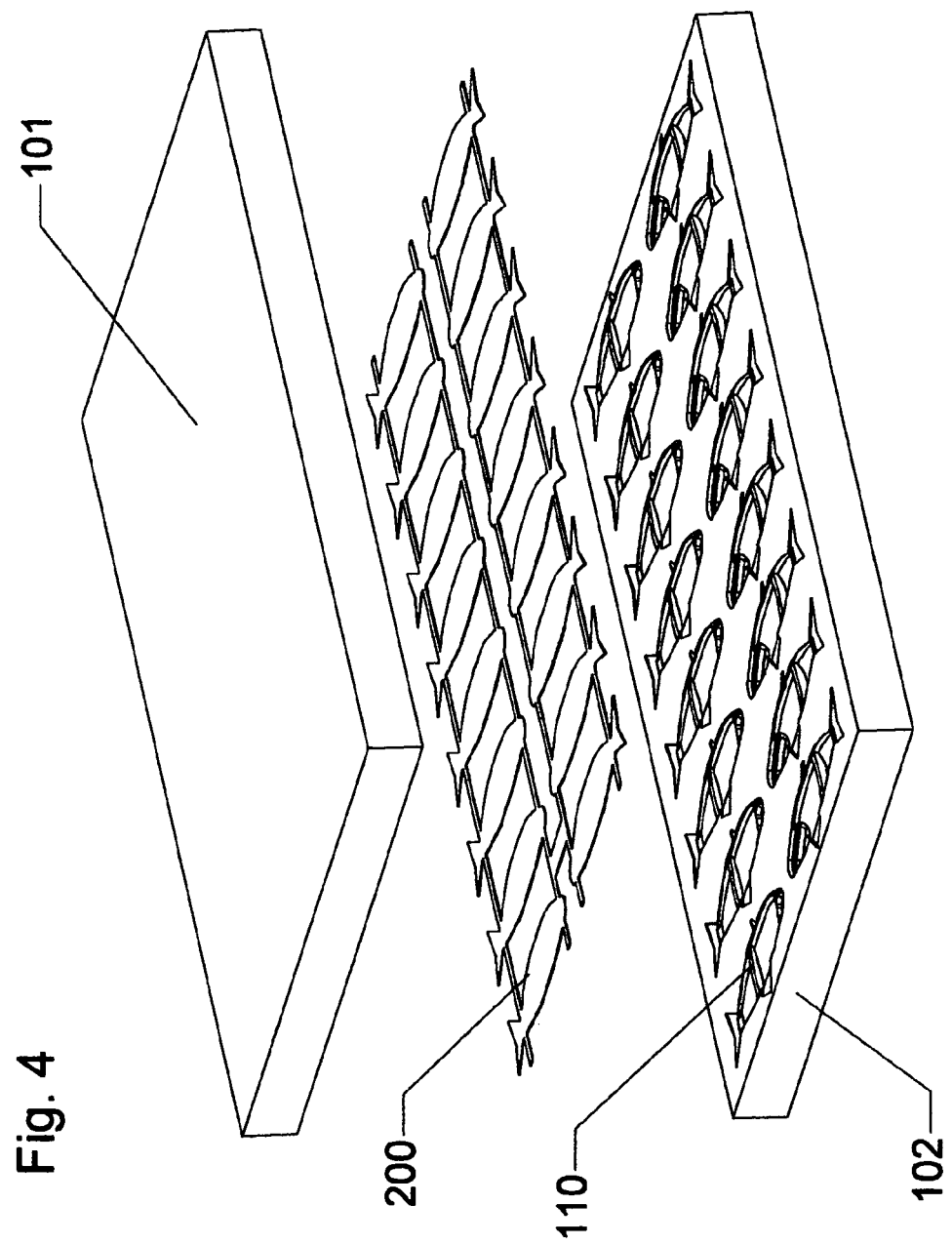

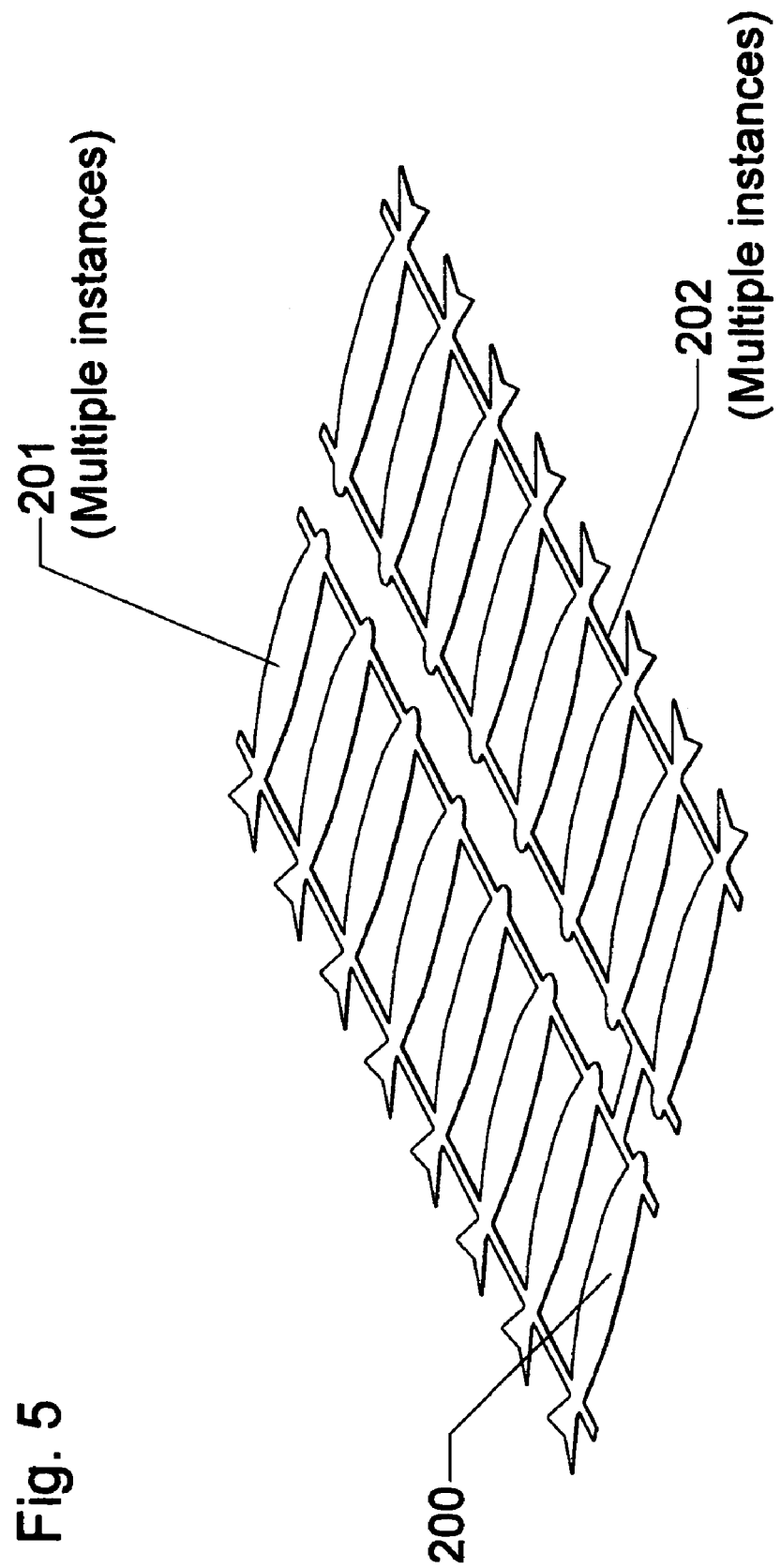

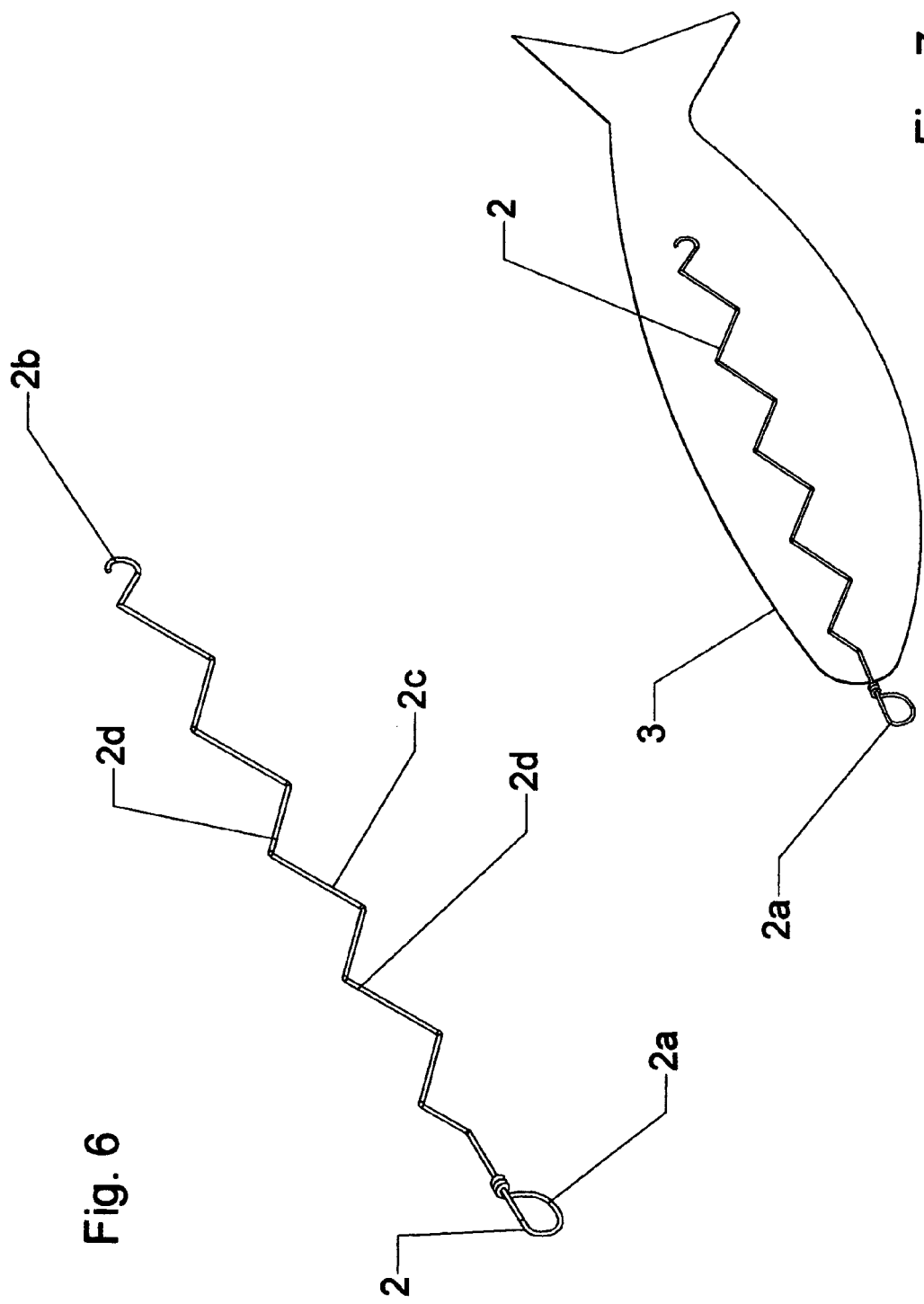

US 7,104,004 B1

BENDABLE FISHERS LURE WITH METHOD OF MANUFACTURE AND ASSEMBLY

CROSS REFERENCES TO RELATED APPLICATIONS

Provisional Application for Patent No. 60/511,617 of Oct. 15, 2003, with the title "Fishers Lure" which is hereby incorporated by reference. Applicant claims priority pursuant to 35 U.S.C. Par. 119(e)(i).

Provisional Application for Patent No. 60/526,475 of Dec. 3, 2003, with the title "Fishers Lure and Method of Method of Manufacture" which is hereby incorporated by reference. Applicant claims priority pursuant to 35 U.S.C. Par. 119(e)(i).

STATEMENT AS TO RIGHTS TO INVENTIONS MADE UNDER FEDERALLY

Not applicable

BACKGROUND OF THE INVENTION

1. Field of the Invention

This invention relates to fishers lure with bendable spline enabling bending of the fishers lure so that a variety of movements may be imparted to the fishers lure by a fisher.

2. Background Information

Plastic lures, when retrieved by a fisher tend to come straight back to the fisher with little side motion.

This is a disadvantage for the fisher in the historic struggle of the fisher to prove he is smarter than the fish.

As will be seen from the subsequent description, the preferred embodiments of the present invention are improvements over the existing struggle for the mastery of the fisher over the fish.

SUMMARY OF THE INVENTION

The present invention in the preferred embodiment is a soft pliable fishers lure body comprising a spine enabling bending of the body into shapes that enable motion to be imparted to the lure while retrieving the lure.

The spine comprises a ring for attachment of a fishers line and a bent tail.

A holographic film comprising fish shaped inserts linked to facilitate manufacture of multiple fishers lure bodies is placed between multiple lure half shaped cavity mold halves.

Plastisol is injected into the mold cavities. The resulting product is removed from the mold, links severed, and a spine with a hook and an eye can be inserted prior to use.

BRIEF DESCRIPTION OF THE DRAWINGS

FIG. 2 illustrates the fishers lure with encased holographic film, after trimming links, prior to spine insertion.

FIG. 3 illustrates one of multiple molded fishers lure bodies prior to trimming interconnections.

FIG. 4 illustrates a holographic film of multiple fish shapes, linked to facilitate manufacturing, with multiple cavity mold halves, prior to molding the fishers lures around the holographic film fish shapes.

FIG. 5 illustrates the holographic film of multiple fish shapes.

FIGS. 6, 7, 8, and 9 illustrate an alternate embodiment of the present invention.

DESCRIPTION OF THE PREFERRED EMBODIMENTS

Figure 1:
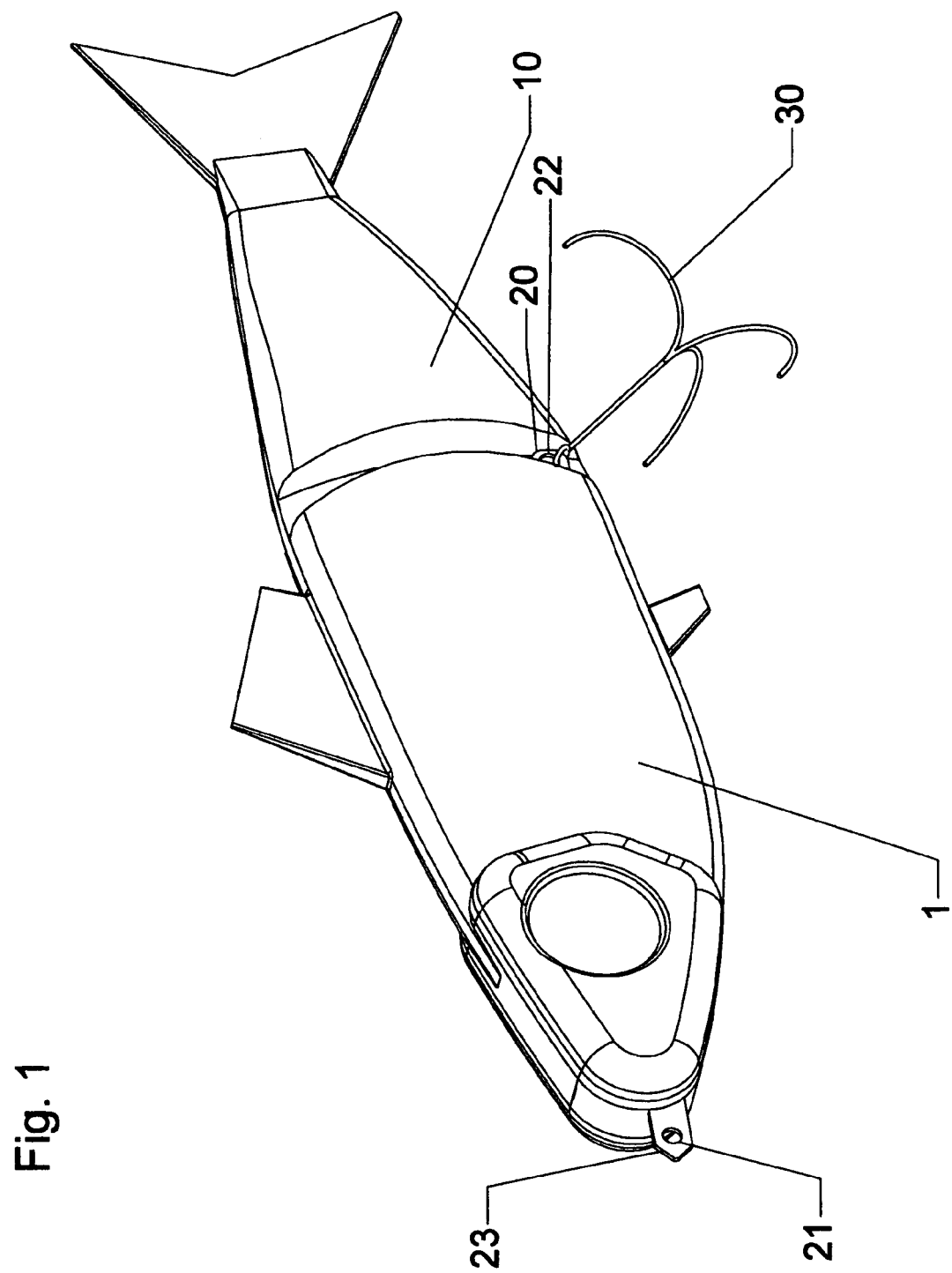
FIG. 1 illustrates a fishers lure with a bendable spine.
Figure 8:
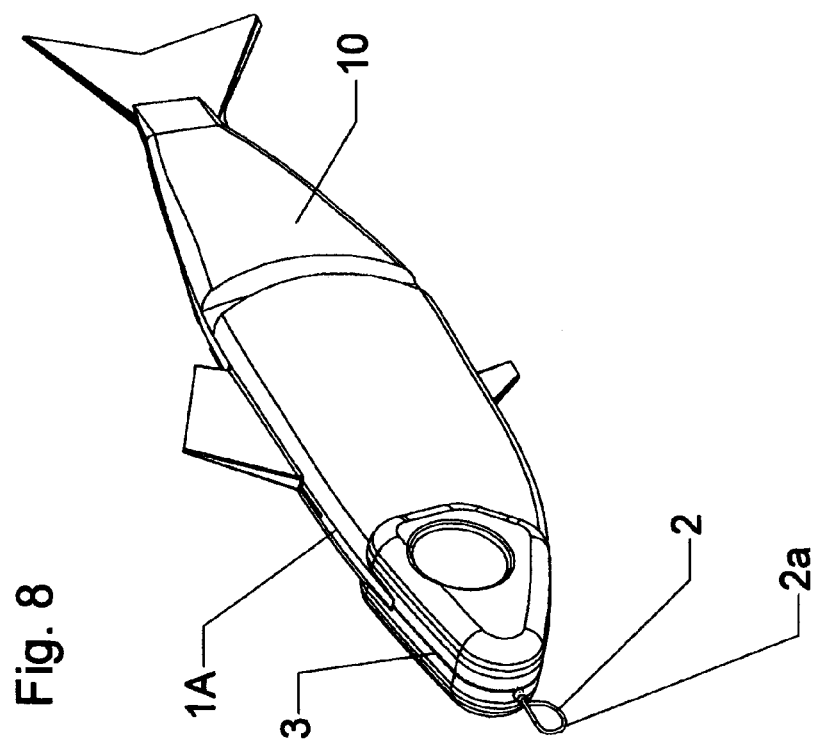

Referring to FIGS. 1, 2, and 3, the preferred embodiment of the present invention is a fishers lure 1 comprising a body 10, said body 10 essentially encasing a holographic film shape 201, a bendable spine 20, and at least one hook 30. The bendable spine 20 comprises an eye 21 to which a fishing line is attachable, a hook attachment eye 22, an insertion end 23, and spine retainer 24.

The spine retainer 24 can be a tab of metal stamped from the spine 20 and bent away from the spine 20. The spine retainer 24 thus formed allows the spine 20 to slide easily into the soft body 10 but attempts to pull the spine 20 back out, such as might be caused by hooking a fish on hook 30, will result in the tab shaped spine retainer 24 digging into the soft body 10, thus resisting removal of the spine 20. An arrow indicates direction of insertion.

In FIG. 2, the fishers lure 1 is shown with the the bendable spine 20 just prior to insertion into the body 10 of the fishers lure 1.

Referring to FIGS. 4 and 5, a holographic film 200 of the shapes 201, the shapes 201 with interconnections 202 can placed between an upper mold half 101 and a lower mold half 102. The holographic film 200 includes a plurality of shapes 201 that can be cut from a full sheet of material, for example, by die cutting. The film 200 has the property of reflectively displaying different colors depending upon the angle from which it is lighted and viewed.

The mold halves 101, 102 have multiple cavities 110, and the shapes 201 can be in alignment with the multiple cavities 110 such that filling the cavities 110 with the material to form the bodies 10 will form the bodies 10 around the shapes 201. The cavities 110 are shown only in the mold half 102 but it will be understood that the cavities 110 can be in both halves 101, 102. It will also be understood that the cavities 110 in one mold half could be mirror images of the cavities 110 in the other half or the cavities 110 could differ in one mold half versus the other.

Referring to FIG. 3, the body 10 of the fishers lure 1 after molding, is shown with the interconnections 202 prior to trimming the interconnections from the body 10.

The molding material of the body 10 is holographic glitter and plastisol flexible plastic, known to the trade, which results in a soft plastic lure 1 which will hold its shape because of the inserted spine 20.

The spine 20, when inserted into the body 10 enables a fisher to bend the fishers lure 1 into various shapes to make the fishers lure 1 swim left, right, up, and down, as desired. It gives the lure 1 a lifelike hydrodynamic action.

In use, a fisher can purchase a package (not shown) containing a spine 20 and a flexible body 10. The flexible body 10 can include an opening 25 (Ref. FIG. 2) molded into it. The opening 25 can be down to the layer of the film 200 such that the fisher can insert the spine 20 starting at the opening 25. Referring to FIG. 2, the fisher can use the insertion end 23 of the spine 20 to gently separate the body 10 material from the holographic film 200 such that the spine 20 can be inserted between the body 10 material and the holographic film 200. As shown in FIG. 1, a light force can drive the spine 20 through the length of the body 10 such that the eye 21 is at the front of the body 10 and the hook attachment eye 22 protrudes near the opening 25. A fishing line can be attached to eye 21 and a hook 30 to the hook attachment eye 22. The fish body 10, spine 20, and holographic film 200 can lie nearly flat, with the holographic film 200 forming a nearly central plane. However, the fisher can bend the body 10, film 200, and spine 20 out of this plane into a shape. The spine 20 will then retain the shape until the fisher desires to bend it into a new shape. The spine 20 and the body 10 can be bent and re-bent many times. The body 10 can be of clear material or tinted such that the holographic film 200 is visible so movement of the body 10 will cause flashes of color that will attract game fish. As shown in FIG. 3, the fishers lure 1 can include features such as eyes, fins, or a tail to enhance the appearance of the fishers lure 1 to look more like the bait it represents. The features could also include print features such as scales on the surface of the body.

FIGS. 6, 7, 8, and 9 illustrate an alternate embodiment fishers lure 1A with the body 10, and an alternate spine 2 encased in shaped holgraphic film 3.

The alternate spine 2 comprises a line attachment end 2*a*, a folded end 2*b*, and a spinal column 2*c*. This can be accomplished, as a means of embodiment, with a single metal wire, bent into a desirable pattern, such as accordion folds 2*d*, with formed said ends 2*a* and 2*b*.

As a means of enablement, in the preferred embodiment of the present invention, the shaped holgraphic film 3, encasing the spine 2, is used to position the spine 2 in a mold while the body 10 is molded around the spine encasement 3 encasing the spine 2.

This results in a soft plastic lure 1A that will hold its shape because of the encased wire spine 2.

The spine 2 enables a fisher to bend the fishers lure 1A into various shapes to make the fishers lure 1 swim left, right, up, and down, as desired. It gives the lure 1 a lifelike hydrodynamic action.

The purpose of the folded end 2*b* is to reduce the risk of a fisher having a finger puntured by the spine 2. Warning labels may someday be mandated, but are seen as detrimental to the utility of the fishers lure 1A.

Figure 9:
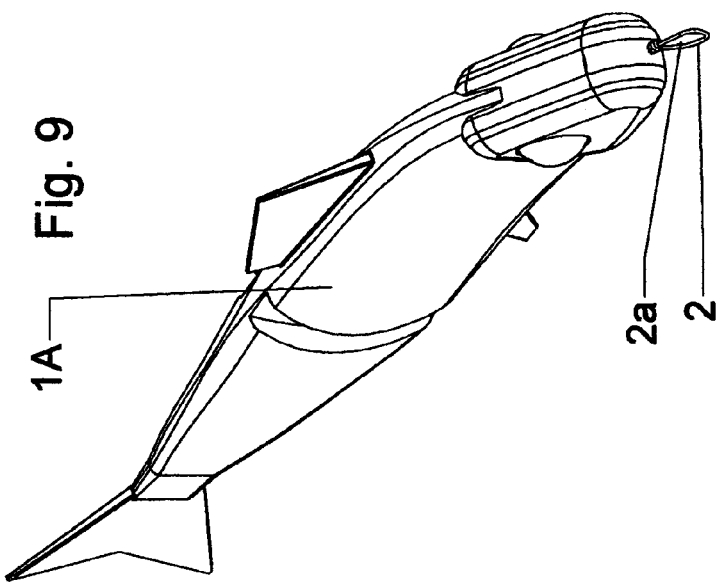

FIG. 9 shows the body 10 bent. The head of the body 10 is bent slightly to the right. This is typical of how either embodiment of the invention can be bent.

Although the description above contains many specificities, these should not be construed as limiting the scope of the invention but as merely providing illustrations of some of the presently preferred embodiments of this invention.

While a wire is a means of fabricating a spine 2, it is not the intention of applicant to limit the spine material to a wire form. There are undoubtably other bendable materials that will hold a shape for the intended purpose.

The materials mentioned are for purposes of enablement. It is not the intention of the applicant to limit his invention to only those materials.

It will be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A method of manufacturing a fishing lure including the steps of;
   cutting a plurality of shapes from holographic film,
   leaving interconnections between the shapes,
   placing the interconnected shapes over a plurality of cavities on a first mold half such that the shapes line up with the cavities;
   placing a second mold half over the first mold half and injecting plastic into the cavities to form a plurality of interconnected lure bodies having a holographic film shape encased in the lure bodies.

2. The method of claim 1 further including the step of trimming the interconnections to form a plurality of separate lures.

3. The method of claim 2 wherein said plastic is a soft flexible plastic.

4. The method of claim 1 wherein said shapes are die cut smaller than the cavities.

5. The method of claim 1 wherein a spine is molded into said lure body.

6. The method of claim 5 wherein said spine is bendable and includes an eye protruding from said lure body to enable attachment of a fishing line to said lure.

7. The method of claim 1 wherein said lure body injecting step includes forming an opening adapted to allow for a spine to be inserted into said lure.

8. The method of claim 7 including the step of inserting the spine such that a first eye adapted to receive a fishing line and a second eye adapted to receive a hook are outside said lure body.

\* \* \* \* \*